United States Patent
Kim et al.

(10) Patent No.: US 8,411,850 B2
(45) Date of Patent: Apr. 2, 2013

(54) PASSWORD SEARCHING METHOD AND SYSTEM IN MULTI-NODE PARALLEL-PROCESSING ENVIRONMENT

(75) Inventors: Keon Woo Kim, Daejeon (KR); Sang Su Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 436 days.

(21) Appl. No.: 12/779,914

(22) Filed: May 13, 2010

(65) Prior Publication Data
US 2011/0135087 A1    Jun. 9, 2011

(30) Foreign Application Priority Data

Dec. 8, 2009    (KR) ........................ 10-2009-0121227

(51) Int. Cl.
  H04L 29/06    (2006.01)
  G06F 21/00    (2006.01)
  G06F 11/30    (2006.01)
  G06F 12/14    (2006.01)
  H04L 9/08    (2006.01)

(52) U.S. Cl. ............ 380/1; 713/167; 713/184; 713/193; 726/4; 380/286

(58) Field of Classification Search ........................ None
See application file for complete search history.

(56) References Cited

U.S. PATENT DOCUMENTS

| | | | |
|---|---|---|---|
| 7,929,707 B1 * | 4/2011 | Belenko | 380/286 |
| 2007/0157032 A1 * | 7/2007 | Paganetti et al. | 713/193 |
| 2008/0052525 A1 * | 2/2008 | Botchek | 713/184 |
| 2008/0086644 A1 | 4/2008 | Beck et al. | |
| 2010/0037050 A1 * | 2/2010 | Karul | 713/167 |
| 2011/0107400 A1 * | 5/2011 | Shankaranarayanan et al. | 726/4 |

\* cited by examiner

*Primary Examiner* — Shin-Hon Chen
(74) *Attorney, Agent, or Firm* — Blakely, Sokoloff, Taylor & Zafman

(57) ABSTRACT

Provided are a method and a system for decrypting a password in multi-node parallel-processing environment including a master node and a plurality of work nodes. The master node receives information on encrypted file selection from a user. The master node generates password candidate information generation information and transmits the password candidate to the plurality of work nodes together with a password decryption command. The password candidate generation information allows the plurality of work nodes to have different password candidate ranges using password decryption information comprising a maximum password length, a minimum password length, and a string set constituting the password. The work node decrypts the password using the password candidate generation information. The work node transmits the password decryption result to the master node.

18 Claims, 4 Drawing Sheets

US 8,411,850 B2

PASSWORD SEARCHING METHOD AND SYSTEM IN MULTI-NODE PARALLEL-PROCESSING ENVIRONMENT

CROSS-REFERENCE TO RELATED APPLICATIONS

This application claims priority under 35 U.S.C. §119 to Korean Patent Application No. 10-2009-0121227, filed on Dec. 8, 2009, in the Korean Intellectual Property Office, the disclosure of which is incorporated herein by reference in its entirety.

TECHNICAL FIELD

The following disclosure relates to a password searching method and a system using the same, and in particular, to a password searching method and a system using the same, which can search a password at a high-speed in multi-node parallel processing environment.

BACKGROUND

Computer users encrypt files by setting passwords when document files and text files are generated, saved, and distributed. Thus, only authorized user accesses a file. Also, due to encryption functions supported by application software itself for various file formats, a user is readily able to encrypt files.

In order to read an encrypted file, a password that has been set in encryption needs to be entered. If a user could not remember the password, a file reading would not be permitted. Also, a file which a user has encrypted may become an evidence or a clue capable of clearing criminal relation. In this case, the file encryption may make discovery of evidences difficult in a forensic process.

Accordingly, password search software or dedicated hardware such as password decryption FGPA may be used in order to find the correct password. Also, data parallel-processing characteristics of GPU may be used to find the password.

When the password search software is needed, a user is able to use the free or low-priced software. However, since tools performing sequential CPU operations are used, the time taken to find the password is usually long. If the dedicated hardware such as FPGA or ASIC for password decryption is used, high-speed password searching is possible. However, since the expensive dedicated equipment manufactured only for password searching can not be used for other purposes, the dedicated hardware is not cost effective and not suitable for general use.

SUMMARY

In one general aspect, a method for decrypting a password in a multi-node parallel-processing environment including a master node and a plurality of work nodes includes: receiving, by the master node, selection information of an encrypted file from a user; generating, by the master node, password candidate generation information to transmit to the plurality of work nodes together with a password decryption command, the password candidate generation information allowing the plurality of work nodes to have different password candidate ranges using password decryption information comprising a maximum password length, a minimum password length, and a string set constituting the password; decrypting, by the work node, the password using the password candidate generation information; and transmitting, by the work node, the password decryption result to the master node.

The password candidate generation information may include a password candidate generation starting point and the number of the password candidates to be decrypted.

In the password candidate generation information, when the minimum password length is 1, (password candidate generation starting point, the number of the password candidates to be decrypted)=(nD, N−(c−1)D) may be transmitted to one of the work nodes, and (password candidate generation starting point, the number of the password candidates to be decrypted)=(nD, D) may be transmitted to the other work nodes, where N is the total number of the password candidates, c is the number of the work nodes, D is N/c, and n means an n-th work node. When the minimum password length is not 1, (password candidate generation starting point, the number of the password candidates to be decrypted)=(S+nD, N−(c−1)D) may be transmitted to one of the work nodes, and (password candidate generation starting point, the number of the password candidates to be decrypted)=(S+nD, D) may be transmitted to the other work nodes, where S is the number of the password candidates generated up to a length of s−1 when the minimum password length is s, N is the total number of the generated password candidates, c is the number of the work nodes, D is N/c, and n means an n-th work node.

The work node may decrypt the password using a graphic processing unit. The master node may generate the password candidate generation information in consideration of the number of threads of the work node.

In the password candidate generation information, when the minimum password length is 1, (password candidate generation starting point, the number of the password candidates to be decrypted)=(nD', N−(c−1)D') may be transmitted to one of the work nodes, and (password candidate generation starting point, the number of the password candidates to be decrypted)=(nD', D') may be transmitted to the other work nodes, where N is the total number of the password candidates, c is the number of the work nodes, n means an n-th work node, and D' means a multiple of the number (T) of the threads adjusted from N/c(=D). When the minimum password length is not 1, (password candidate generation starting point, the number of the password candidates to be decrypted)=(S+nD', N−(c−1)D') may be transmitted to one of the work nodes, and (password candidate generation starting point, the number of the password candidates to be decrypted)=(S+nD', D') may be transmitted to the other work nodes, where N is the total number of the generated password candidates, S is the number of the password candidates generated up to a length of s−1 when the minimum password length is s, c is the number of the work nodes, n means an n-th work node, and D' means a multiple of the number (T) of the threads adjusted from N/c (=D).

When N−(c−1)D' is not a multiple of t(=D/T), t−((N−(c−1)D')mod t) may be added to N−(c−1)D'.

In another general aspect, a master node of a multi-node parallel-processing password decryption system including a master node and a plurality of work nodes: generates password candidate generation information and transmitting the password candidate generation information to the plurality of work nodes together with a password decryption command, the password candidate generation information allowing the plurality of work nodes to have different password candidate ranges using password decryption information comprising a maximum password length, a minimum password length, and a string set constituting a password; and receives a password decryption result from the work node. A work node of a multi-node parallel-processing password decryption system including a master node and a plurality of work nodes: receives the password candidate generation information allowing the plurality of work nodes to have different password candidate ranges and a password decryption command from the master node; decrypts a password using the password candidate generation information; and transmits the password decryption result to the master node.

Other features and aspects will be apparent from the following detailed description, the drawings, and the claims.

DETAILED DESCRIPTION OF EMBODIMENTS

Figure 1:
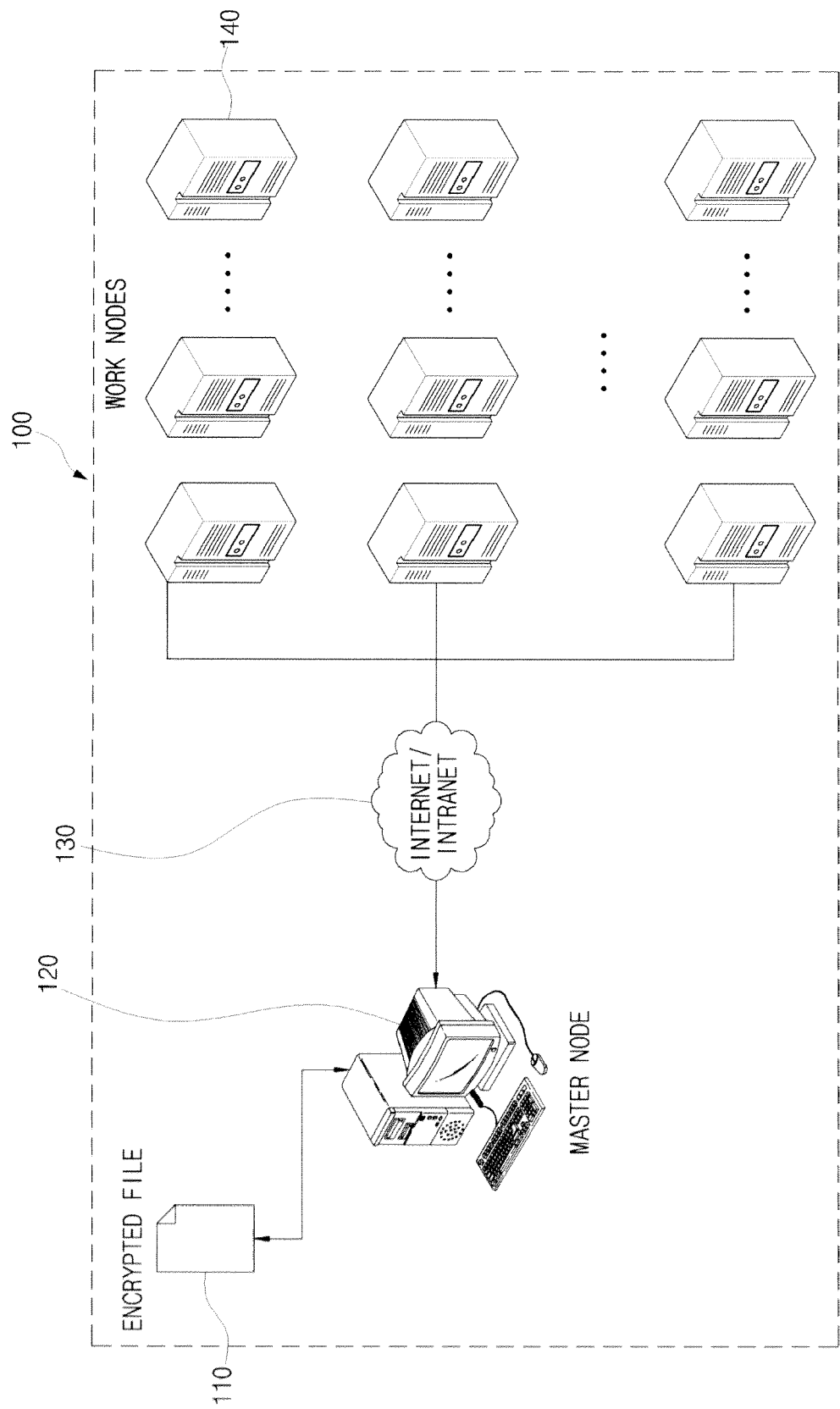
FIG. 1 is a diagram illustrating a password decryption system according to an exemplary embodiment.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating a password decryption system according to an exemplary embodiment.

Referring to FIG. 1, a password decryption system 100 may include a master node 120 storing an encrypted file and a plurality of work nodes 140 connected thereto. The work nodes 140 may be directly connected to the master node 120. The master node 120 and the work nodes 140 may be connected via a network 130.

According to this embodiment, it is possible to quickly decrypt the password using a distributed processing of password decryption in the multi-node parallel-processing environment.

In order to encrypt a password of an encrypted file 110, the master node 120 may include a user interface (not shown) selecting an encrypted file that is a target of the password decryption and selecting expected maximum/minimum password lengths and a string set constituting the password as password decryption information. Also, the master node 120 may know the number of the work nodes 140 connected thereto.

The master node 120 may transmit the inputted information and information known by the master node 120 together with a decryption execution command to the respective work nodes 140. Also, the master node 120 may instruct the work nodes 140 to stop/pause/resume the password decryption execution. If the work node 140 completes the password decryption, the master node 120 may be notified of the decryption result.

The work node 140 may receive the string, the password length, and the password candidates to be investigated together with the password execution command from the master node 120 to execute the password decryption by actual complete enumeration. That is, the work node 140 may generate all password candidates that can be combined using the string used as the password candidates and the minimum/maximum password lengths designated by a user. The generated password candidates may be inputted into a password decryption mechanism one by one, and the actual password decryptions are repeatedly performed. Thus, the master node 120 may be informed whether the password decryption is successful.

Figure 2:
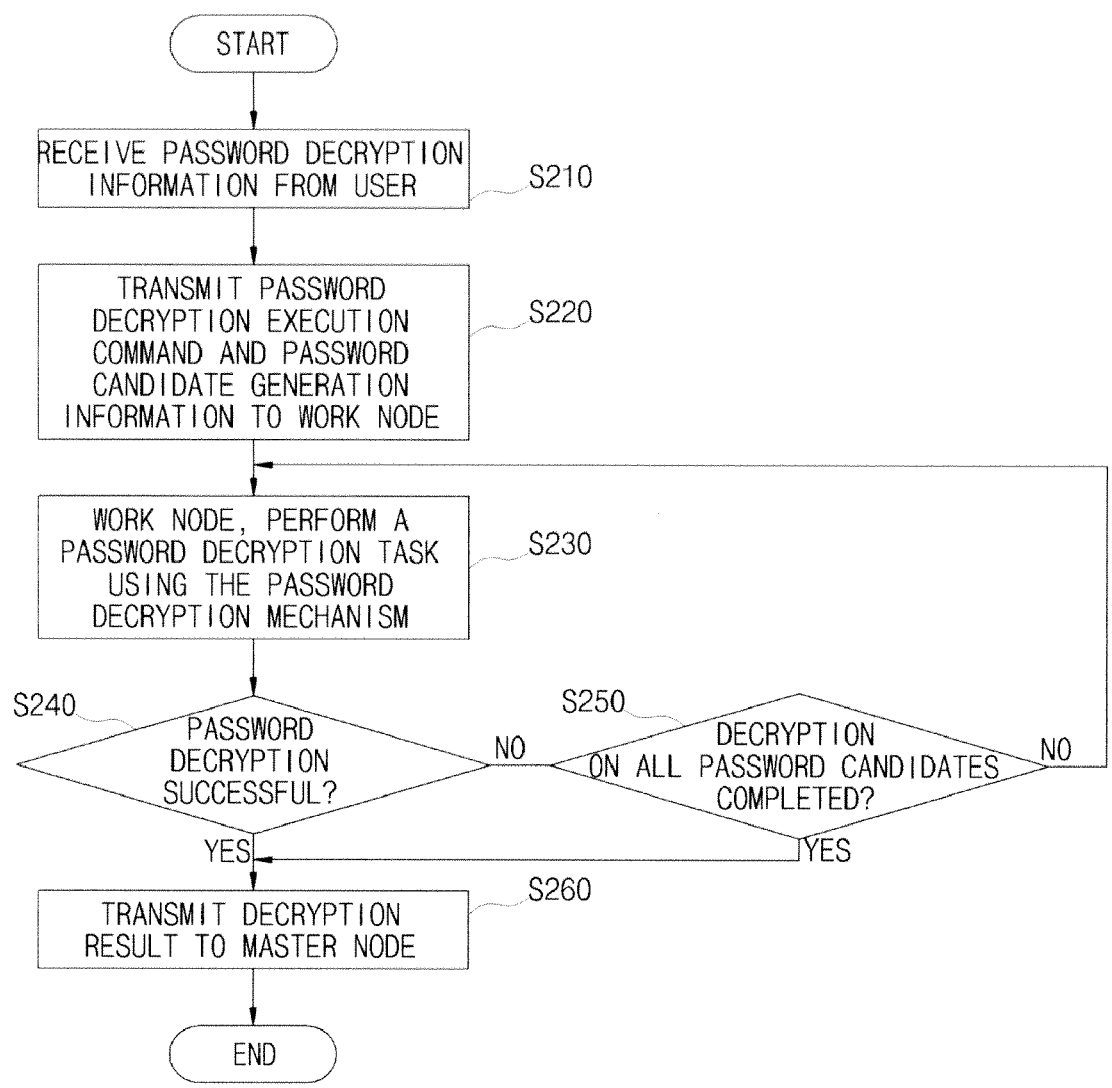
FIG. 2 is a flowchart illustrating a password decryption method according to an exemplary embodiment.

FIG. 2 is a flowchart illustrating a password decryption process in the password decryption system 100 as described in FIG. 1.

Referring to FIG. 2, in operation S210, the master node 120 may receive password decryption information from a user. The password decryption information may include a decryption target file, expected maximum/minimum password lengths, and a string set constituting the password.

In operation S220, the master node 120 may transmit a password decryption command together with the password decryption information from the user to a work node 140.

In operation S230, the work node 140 having received the password decryption command may perform a password decryption task using the password decryption information.

In operation S240, if the password decryption is successful in the password decryption task, the corresponding work node 140 may transmit the decryption result to the master node 120. In operation S250, the work node 140 that does not succeed in the password decryption may determine whether decryption is completely performed on all password candidates assigned to it. If not, the procedure may return to operation S230, and the password decryptions are repeatedly performed. In operation S250, if the decryption task has been completed on all password candidates, the decryption result is transmitted to the master node 120.

Considerable time may be taken to decrypt a password having a long length. Accordingly, it is important to shorten the time by performing a parallel-processing using a plurality of work nodes 140. In this case, the respective work nodes 140 need to perform the decryption task on different password candidates. This is because it is inefficient for the plurality of work nodes 140 to perform the same decryption task on the same password candidate set.

In this embodiment, the master node 120 may distribute different password candidate generation information to the respective work nodes 140 so that the work nodes 140 do not use the same password candidate as each other.

The number of characters that can be used as a password candidate may be about 95 including 10 numerals, 26 English lower cases, 26 English upper cases, and 33 special characters. The password candidates may be generated by combining the characters. The password candidate may be a combination of 10 numerals, or may be a combination of 36 characters including numerals and English lower cases. For complete enumeration, a password candidate consisting of a combination of 95 characters may be generally applied to actual password decryption. In this case, the total number of password candidates to be decrypted is expressed as Equation (1) below, and may be calculated in the master node 120.

$$N = \frac{a(r^t - 1)}{r - 1} - \frac{a(r^{s-1} - 1)}{r - 1} = \frac{a(r^t - r^{s-1})}{r - 1} \quad (1)$$

N: the total number of password candidates to be searched
a: the number of strings having a password length of 1
r: the number of characters usable as a password
t: the maximum length of password set by a user
s: the minimum length of password set by a user That is, the total number of generated password candidates is the sum of geometric series generating from s to t of the password length.

For example, if a user selects all strings, the maximum length of the password is set to 5, and the minimum length of the password is set to 1, then N may be expressed as Equation (2) below.

$$N = \frac{a(r^n - 1)}{r - 1} = \frac{95(95^5 - 1)}{95 - 1} = 7,820,126,495 \quad (2)$$

As another example, if a user selects all strings, the maximum length of the password is set to 7, and the minimum length of the password is set to 5, then N may be expressed as Equation (3) below.

$$N = \frac{95(95^7 - 1)}{95 - 1} - \frac{95(95^5 - 1)}{95 - 1} \quad (3)$$
$$= 70,576,641,626,495 - 82,317,120$$
$$= 70,576,559,309,375$$

When the master node 120 delivers a password decryption command, the master node 120 may assign the generation information of the password to be decrypted, i.e., the generation starting point of the password candidate and the number of the password candidates to be decrypted together with information on string and password length to respective work nodes 140. The work node 140 having received the information may start actual password decryption by generating respective password candidates, where there is no duplicate password candidate between the work nodes 140.

Hereinafter, a method for distributing the password candidate generation information to the work nodes will be described in detail. The password candidate generation information may include the password candidate generation starting point and the number of the password candidates to be decrypted.

The number of the password candidates distributed to each of the work nodes may be expressed as D=N/c, where N is the total number of the password candidates calculated by the master node, and c is the number of the work nodes. The master node knows the number of the work nodes, and n means n-th work node. That is, if c=5, n=0, 1, 2, 3, and 4.

If D includes a decimal, and the decimal may be ignored to take only the integer part from D, then D or more password candidates are distributed to one work node. In other case, if D includes a decimal and is rounded up, then D or less password candidates are distributed to one work node. In the latter case, the decryption time is more shortened than that in the former case.

When the minimum password length is 1, the password candidate generation information (starting point and the number of password candidates) distributed to the work node may be (nD, D). Then, the work node may generate password candidates as many as D to execute password decryption. In this case, the information of (nD, N−(c−1)D) may be distributed to one work node.

Also, when the minimum password length is not 1, the password candidate generation information (starting point and the number of password candidates) distributed to the work node may be (S+nD, D), where S is the number of the password candidates generated up to a length of (s−1). Information of (S+nD, N−(c−1)D) may be delivered to one work node.

For example, let us assume that c=9 (work node 0 to work node 8), N=1000, and D=112 are defined in the master node. Then, the password candidate generation information (starting point and the number of password candidates) delivered to each work node will be as follows.

work node 0 to work node 7: (0, 112), (112, 112), (112), . . . , (112*7, 112)
work node 8: (896, 104)

The work node 0 may generate 112 password candidates from 0 to 111th among 1,000 password candidates to use them in actual password decryption. The work node 7 may generate 112 password candidates from 784th to 895th among 1,000 password candidates to use them in the actual password decryption. The mechanism for generating the password candidates is the same in all work nodes as well as the master node. Each of the work nodes may generate only the password candidates pertaining to a password candidate generation range assigned to it. The method for generating the password candidate by the work node and applying them to a decryption mechanism is not limited. Detailed description thereof will be omitted below.

The order of the information distributed to the work nodes 0 to 7 may be changed. One of nine work node except the work node 8 may receive (896, 104). That is, the plurality of work nodes need not to receive information in order.

As another example, if the minimum password length=1, the maximum password length=5, and c=95 are defined in the master node, then the calculation result is N=7,820,126,495, and D=82,317,121. N password candidates may include {0th password candidate, 1st password candidate, 2nd password candidate, . . . , 7,820,126.494th password candidate}. The master node may only calculate the number, but not generate the password candidates actually. Each work node may receive the password candidate generation information (starting point and the number of password candidates) from the master node to generate only the password candidates of a specific section.

work nodes 0 to 94: (0, 82,317,121), (82,317,121, 82,317, 121), (82,317,121*2, 82,317,121), . . . , (82,317,121*93, 82,317,121), (82,317,121*94, 82,317,121)

The work node 0 may generate 82,317,121 password candidates from 0th to 82,317,120th among 7,820,126,495 password candidates to use them in actual password decryption. The last work node 95 may generate 82,317,121 password candidates starting from 82,317,121*94th among 7,820,126, 495 password candidates to use them in the actual password decryption.

Figure 3:
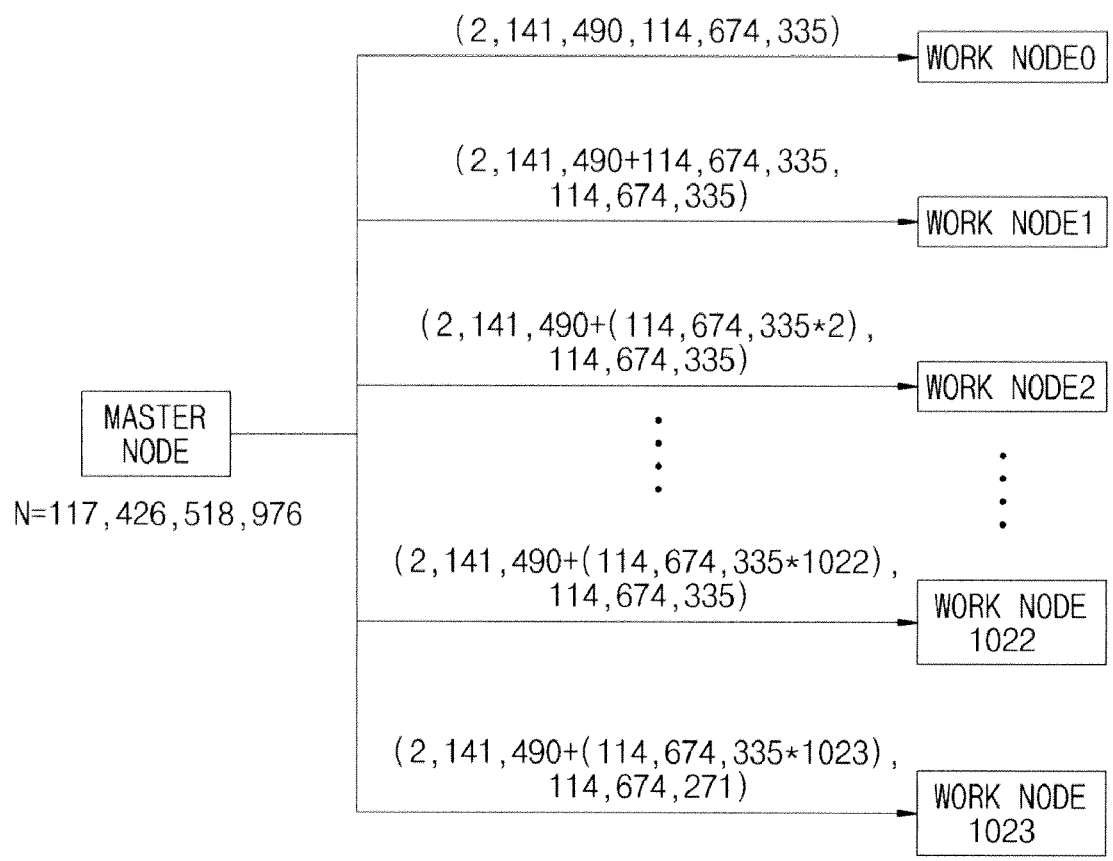
FIG. 3 is a diagram illustrating a password candidate generation information distributed into each work node when the password minimum length=5, the password maximum length=7, and c=1024 in a password decryption method according to an exemplary embodiment.

As another example, if the minimum password length=5, the maximum password length=7, and c=1,024 are defined in the master node, then N=117,426,518,976, and D=114,674, 335. In this case, the password candidate generation information distributed to each work node will be described as follows, which is shown in FIG. 3.

N: 117,426,518,976 password candidates consisting of {0th password candidate, 1st password candidate, 2nd password candidate, . . . , 117,426,518,975th password candidate} the number of the password candidates generated up to the length 4: 2,141,490 work nodes 0 to 1022: (2,141,490, 114,674,335), (2,141, 490+114,674,335, 114,674,335), (2,141,490+(114,674, 335*2), 114,674,335), . . . , (2,141,490+ (114,674.335*1022), 114,674,335)

work node 1023: (2,141,490+(114,674,335*1023), 114, 674,271)

As another example, when the work nodes use Graphic Processing Unit (GPU) for high-speed password decryption, the master node may calculate the password candidate generation information (starting point and the number of password candidates) in consideration of the number of threads used in the work nodes, and distribute the information to each of the work nodes.

GPU may serve as a multi-thread data parallel-processing co-processor for high-speed password decryption. So, when one password candidate may be inputted into one thread and then password decryption operation is executed, GPU may use a plurality of threads simultaneously to process a plurality of password candidates at one time. That is, GPU may attempt to perform password decryption on T password candidates using T threads at one and the same time. GPU may repeat this operation until the correct password is found. In this case, the number of the threads may be predetermined to be used in the password decryption. Since the decryption mechanism varies with applications (for example, MS-Word, PDF, and MS-PowerPoint), the numbers of threads used in the respective decryption mechanisms are also different from each other.

A method by which a master calculates the number D' of password candidates in consideration of the number of threads of work nodes can be expressed as follows.

N: the total number of password candidates calculated by the master node c: the number of work nodes connected to the master node D=N/c: the theoretical number of password candidates distributed to each work node regardless of the number of threads T: the number of thread defined in the work node.

D': Since GPU is executed by unit of T, D is adjusted to a multiple of T t=D/T: value obtained by dividing the number of password candidates for each work node by the number of threads D'=t*T: the number of password candidates distributed to each work node in consideration of the number of threads In t=D/T, where t includes a decimal point and is rounded down D' or more password candidates are distributed to one of work nodes In t=D/T, where t includes a decimal point and is rounded up D' or less password candidates are distributed to one of work nodes As described above, in a state where D' has been calculated in the master node, the password candidate generation information (starting point and the number of password candidates) distributed to each work node may be as follows. n means n-th work node. That is, if c=5, n=0, 1, 2, 3, and 4.

When the minimum password length set in the master node is 1

(starting point and the number of password candidates)= (nD', D')

One of the work nodes=(nD', N−(c−1)D')

When the minimum password length (s) set in the master node is not 1

S: the number of password candidates generated up to a length of (s−1)

(Starting point and the number of password candidates)= (S+nD', D')

One of the work nodes=(S+nD', N−(c−1)D')

In the above method, if N−(c−1)D is not a multiple of t in decryption of N−(c−1)D' passwords by one work node, t−((N−(c−1)D')mod t) should be added to N−(c−1)D'. This is because the password decryption using GPU is performed by unit of t. Then, the sum of the number of password candidates to be decrypted by each work node becomes greater than the total number N of the password candidates calculated by the master node by t−((N−(n−1)D')mod t). Since the work node performs operations by unit of thread, the amount of decryption is not increased.

Information distributed from the master node to the work nodes according to the above method will be exemplified below.

As a first example, if the minimum password length=1, the maximum password length=5, the number c of work nodes is 95, and the number T of threads defined in each work node is 7,680, then the total number N of the password candidates calculated in the master node is 7,820,126,495, and the theoretical number D of the password candidates to be distributed to each work node is 82,317,121 when the number of threads not considered. In this case, D divided by T, t=(82,317,121/ 7,680)=10,718, and the number of threads actually distributed to the work node in consideration the number of threads, D'=(10,718*7,680)=82,314,240. Then, N is the total number of password candidates generated by the master node, which consist of {0th password candidate, 1st password candidate, 2nd password candidate, . . . , 7,820,126,494th password candidate}. The information actually distributed from the work node 0 to the work node 94 is (0, 82,314,240), (82,314, 240, 82,314,240), (82,314,240*2, 82,314,240), . . . , (82,314, 240*93, 82,314,240), (82,314,240*94, 82,587,935).

The work node 0 having received this information may use 7,680 password candidates at one and the same time among 82,314,240 password candidates from 0th password candidate to 82,314,239th password candidate. This operation may be repeatedly performed up to maximum 10,718 times while increasing password candidates by 7,680 until the correct password is found. The mechanisms for generating password candidates in all work nodes as well as the master node are identical to each other. Accordingly, each of the work nodes may generate password candidates and perform the decryption process, only in a password candidate generation range assigned to it.

As a second example, let us assume that include a decimal point and is rounded down.

Minimum password length=5, maximum password length=7, c=1024, and T=65,536

N=117,426,518,976, D=114,674,334, t=(114,674,334/65, 536)=1,749,

D'=(1,749*65,536)=114,622,464

N: {0th password candidate, 1st password candidate, 2nd password candidate, . . . , 117,426,518,975th password candidate}

The number of password candidate generated up to a length of 4: 2,141,490

Work nodes 0 to 1022: (2,141,490, 114,622,464), (2,141,490+114,622,464, 114,622,464), (2,141,490+ (114,622,464*2), 114,622,464), . . . , (2,141,490+(114, 622,464*1022), 114,622,464)

Work node 1023: (2,141,490+(114,622,464*1023), 167, 738,304)

Since 167,738,304 is not a multiple of 1,749 in the work node 1023, 1,749−167,738,304 mod 1,749=1,290. Accordingly, the actual number of the password candidates to be decrypted by the work node 1023 may be obtained by 167,738,304+1,290=167,739,594.

Accordingly, work node 1023: (2,141,490+(114,622,464*1023), 167,739,594)

The order of the information distributed to the work nodes 0 to 1023 may be changed. Another node of 1,024 work nodes except the work node 1023 may receive (2,141,490+(114,622,464*1023), 167, 739,594). That is, the plurality of work nodes may not receive the information in order.

Figure 4:
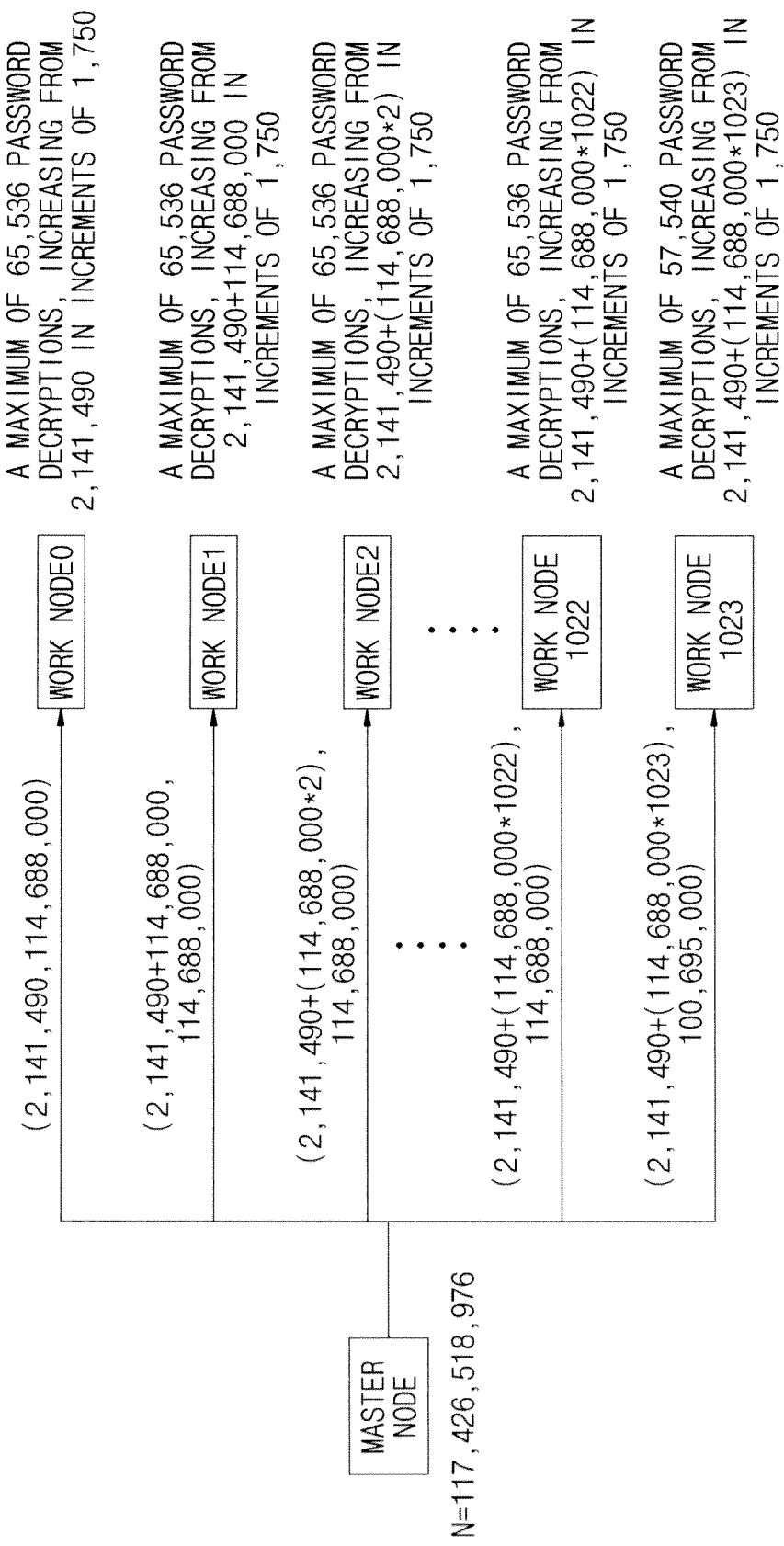
FIG. 4 is a diagram illustrating a password candidate generation information distributed into each work node when the password minimum length=5, the password maximum length=7, c=1024, T=65,536 in a password decryption method according to an exemplary embodiment.

As a third example, let us assume that t include a decimal point and is rounded up. Other conditions are the same as the second example. The third example is shown in FIG. 4.

There is a difference between the first and second examples in calculation because t differs from that of the second example.

Minimum password length=5, maximum password length=7, c=1024, and T=65,536

N=117,426,518,976, D=114,674,334, t=(114,674,334/65,536)=1,750, and D'=(1,750*65,536)=114,688,000

The number of password candidate generated up to a length of 4: 2,141,490

Work nodes 0 to 1022: (2,141,490, 114,688,000), (2,141,490+114,688,000, 114,688,000), (2,141,490+(114,688,000*2), 114,688,000), . . . , (2,141,490+(114,688,000*1022), 114,688,000)

Work node 1023: (2,141,490+(114,688,000*1023), 100,694,976)

Since 100,694,976 is not a multiple of 1,750 in the work node 1023, 1,750−100,694,976 mod 1,750=24. Accordingly, the number of the password candidates to be decrypted by the work node 1023 may be obtained by 100,694,976+24=100,695,000.

Accordingly, work node 1023: (2,141,490+(114,688,000*1023), 100,695,000)

In the third example, one of the work nodes may retrieve 100,695,000 password candidates, and the other work nodes may perform the decryption task by 114,688,000 candidates. In the second example, one of the work nodes may retrieve 167,739,594 password candidates, and the other work nodes may perform the decryption task by 114,622,464 candidates.

After all work nodes complete the password decryption, each of the work nodes may inform the master node of the decryption result. Thus, it can be known whether the password decryption is successful. In the second example, since one of the work nodes performs the password decryption on more password candidates than other work nodes, the result notification to the master node may be delayed compared to the other work nodes. Accordingly, the third example may be preferred in terms of decryption time. That is, when t include a decimal point, the rounding up of the decimal point is more advantageous in that the decryption time is more shortened.

The invention can also be embodied as computer readable codes on a computer-readable storage medium. The computer-readable storage medium is any data storage device that can store data which can be thereafter read by a computer system. Examples of the computer-readable storage medium include ROMs, RAMs, CD-ROMs, DVDs, magnetic tapes, floppy disks, registers, buffers, optical data storage devices, and carrier waves (such as data transmission through the Internet). The computer-readable storage medium can also be distributed over network coupled computer systems so that the computer readable codes are stored and executed in a distributed fashion. Also, functional programs, codes, and code segments for accomplishing the present invention can be easily construed by programmers skilled in the art to which the present invention pertains.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for decrypting a password in a multi-node parallel-processing environment including a master node and a plurality of work nodes, the method comprising the steps of:
   receiving, by the master node, selection information on encrypted e selection from a user;
   generating, by the master node, password candidate generation information to transmit to the plurality of work nodes together with a password decryption command, the password candidate generation information allowing the plurality of work nodes to have different password candidate ranges using password decryption information comprising a maximum password length, a minimum password length, and a string set constituting the password;
   decrypting, by the work node, the password using the password candidate generation information; and transmitting, by the work node, the password decryption result to the master node,
   wherein, in the password candidate generation information, when the minimum password length is 1, (password candidate generation starting point, the number of the password candidates to be decrypted)=(nD, N−(c−1) is transmitted to one of the work nodes, and (password candidate generation starting point, the number of the password candidates to be decrypted)=(nD,D) is transmitted to the other work nodes, where N is the total number of the password candidates, c is the number of the work nodes, D is N/c, and n means an n-th work node.

2. The method of claim 1 wherein the password candidate generation information comprises a password candidate generation starting point and the number of the password candidates to be decrypted.

3. The method of claim 2, wherein, in the password candidate generation information, when the minimum password length is not 1, (password candidate generation starting point, the number of the password candidates to be decrypted)=(S+nD, N−(c−1)D) is transmitted to one of the work nodes, and (password candidate generation starting point, the number of the password candidates to be decrypted)=(S+nD, D) is transmitted to the other work nodes, where S is the number of the password candidates generated up to a length of s−1 when the minimum password length is s, N is the total number of the generated password candidates, c is the number of the work nodes, D is N/c, and n means an n-th work node.

4. The method of claim 1, wherein the work node decrypts the password using a graphic processing unit.

5. The method of claim 4, wherein the master node generates the password candidate generation information in consideration of the number of threads of the work node.

6. The method of claim 5, wherein, in the password candidate generation information, when the minimum password length is 1, (password candidate generation starting point, the number of the password candidates to be decrypted)=(nD', N−(c−1)D') is transmitted to one of the work nodes, and (password candidate generation starting point, the number of the password candidates to be decrypted)=(nD', D') is transmitted to the other work nodes, where N is the total number of the password candidates, c is the number of the work nodes, n means an n-th work node, and D' means a multiple of the number T of the threads adjusted from N/c(=D).

7. The method of claim 6, wherein, when N−(c−1)D' is not a multiple of t(=D/T), t−((N−(c−1)D')mod t) is added to the N−(c−1)D'.

8. The method of claim 5, wherein, in the password candidate generation information, when the minimum password length is not 1, (password candidate generation starting point, the number of the password candidates to be decrypted)=(S+nD', N−(c−1)D') is transmitted to one of the work nodes, and (password candidate generation starting point, the number of the password candidates to be decrypted)=(S+nD', D') is transmitted to the other work nodes, where N is the total number of the generated password candidates, S is the number of the password candidates generated up to a length of s−1 when the minimum password length is s, c is the number of the work nodes, n means an n-th work node, and D' means a multiple of the number T of the threads adjusted from N/c (=D).

9. The method of claim 8, wherein, when N−(c−1)D' is not a multiple of t(=D/T), t−((N−(c−1)D')mod t) is added to the N−(c−1)D'.

10. A master node of a multi-node parallel-processing password decryption system including a master node and a plurality of work nodes, the master node:
configured to generate password candidate generation information and transmitting the password candidate generation information to the plurality of work nodes together with a password decryption command, the password candidate generation information allowing the plurality of work nodes to have different password candidate ranges using password decryption information comprising a maximum password length, a minimum password length, and a string set constituting a password; and
configured to receive a password decryption result from the work node, wherein, in the password candidate generation information, when the minimum password length is 1, (password candidate-generation starting point, the number of the password candidates to be decrypted)=(nD, N−(c−1)D) is transmitted to one of the work nodes, and (password candidate generation starting point, the number of the password candidates to be decrypted)=(nD, D) is transmitted to the other work nodes, where N is the total number of the password candidates, c is the number of the work nodes, D is N/c, and n means an n-th node.

11. The master node of claim 10, wherein the password candidate generation information comprises a password candidate generation starting point and the number of the password candidates to be decrypted.

12. A work node of a multi-node parallel-processing password decryption system including a master node and a plurality of work nodes, the work node:

configured to receive password candidate generation information allowing the plurality of work nodes to have different password candidate ranges and a password decryption command from the master node;
configured to decrypt a password using the password candidate generation information, and transmit the password decryption result to the master node, wherein, in the password candidate generation information, when the minimum password length is 1, (password candidate generation starting point, the number of the password candidates to be decrypted)=(nD, N−c−1)D is transmitted to one of the work nodes, and (password candidate generation starting point, the number of the password candidates to be decrypted)=(nD, D) is transmitted to the other work nodes, where N is the total number of the password candidates, c is the number of the work nodes, D is N/c, and n means an n-th work node.

13. The work node of claim 12, wherein the work node decrypts a password using a graphic processing unit.

14. The work node of claim 13, wherein the password candidate generation information is generated in consideration of the number of threads of the work node.

15. A multi-node parallel-processing password decryption system, the system comprising:
a master node generating password candidate generation information and transmitting the password candidate generation information together with a password decryption command; and
a plurality of work nodes receiving the password candidate generation information from the master node, decrypting the password using the password candidate generation information, and transmitting the password decryption result to the master node,
wherein the password candidate generation information allows the plurality of work nodes to have different password candidate ranges using password decryption information comprising a maximum password length, a minimum password length, and a string set constituting a password, wherein, in the password candidate generation information, when the minimum password length is 1, (password candidate generation starting point the number of the password candidates to be decrypted)= (nD, N−(c−1)D) is transmitted to one of the work nodes, and (password candidate generation starting point, the number of the password candidates to be decrypted)= (nD, D) is transmitted to the other work nodes, where N is the total number of the password candidates, c is the number of the work nodes, D is N/c and n means an n-th work node.

16. The system of claim 15, wherein the password candidate generation information comprises a password candidate generation starting point and the number of the password candidates to be decrypted.

17. The system of claim 15, wherein the work node decrypts the password using a graphic processing unit.

18. The work node of claim 17, wherein the password candidate generation information is generated in consideration of the number of threads of the work node.

* * * * *